(12) United States Patent
Vacca et al.

(10) Patent No.: US 8,936,121 B2
(45) Date of Patent: Jan. 20, 2015

(54) HEAT EXCHANGE BLOCK FOR A MOTOR VEHICLE

(75) Inventors: Frederic Vacca, Behoust (FR); Ngy Srun Ap, Saint-Remy-les-Chevreuses (FR); Jacques Sigonneau, Theuvy-acheres (FR); Manuel Henner, Auffargis (FR); Bruno Demory, Marines (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 53 days.

(21) Appl. No.: 13/498,174

(22) PCT Filed: Sep. 28, 2010

(86) PCT No.: PCT/EP2010/064341
§ 371 (c)(1),
(2), (4) Date: Jun. 12, 2012

(87) PCT Pub. No.: WO2011/039170
PCT Pub. Date: Apr. 7, 2011

(65) Prior Publication Data
US 2012/0241128 A1    Sep. 27, 2012

(30) Foreign Application Priority Data
Sep. 29, 2009    (FR) ..................................... 09 04647

(51) Int. Cl.
*B60K 11/04*    (2006.01)
*B60K 11/08*    (2006.01)

(52) U.S. Cl.
CPC ............... *B60K 11/04* (2013.01); *B60K 11/085* (2013.01)
USPC .......................................... 180/68.1; 165/44

(58) Field of Classification Search
CPC ...... B60K 11/085; B60K 11/04; B60K 11/08; F01P 7/10; F01P 11/10
USPC ......... 180/68.1, 68.2, 68.3, 68.4, 68.6, 69.22; 296/193.1; 49/74.1; 123/41.04, 41.48, 123/41.49, 41.51; 165/41, 44, 47
See application file for complete search history.

(56) References Cited

U.S. PATENT DOCUMENTS 1,724,472 A * 8/1929 Good .......................... 123/41.06
1,950,218 A * 3/1934 Bierbach ........................... 49/96

(Continued)

FOREIGN PATENT DOCUMENTS

DE    3019599 A1    12/1980
DE    4123271 C1    6/1992

(Continued)

OTHER PUBLICATIONS

English language translation for DE 3019599 extracted from the espacenet.com database on May 21, 2012, 19 pages.

(Continued)

*Primary Examiner* — Brodie Follman
(74) *Attorney, Agent, or Firm* — Howard & Howard Attorneys PLLC

(57) ABSTRACT

A heat exchange block (1) for a motor vehicle, includes at least one heat exchanger (2, 3, 4), wherein the block (1) is intended to be disposed behind a front grille (6) of a vehicle and to be traversed by air originating from an opening in the grille. The block includes a group of louvers (13) that can move between an open position and a closed position in order to modulate the flow of air (A) passing through the heat exchanger (2, 3, 4) and a channel (9) that can be disposed between the opening in the grille and the heat exchange block (1). The heat exchange block is suitable for any motor vehicle, but, in particular, hybrid and electric vehicles.

5 Claims, 4 Drawing Sheets

(56) References Cited

U.S. PATENT DOCUMENTS

| | | | |
|---|---|---|---|
| 2,276,279 A * | 3/1942 | Asklund | 180/68.1 |
| 3,205,964 A * | 9/1965 | Henry-Biabaud | 180/68.1 |
| 3,923,114 A * | 12/1975 | Suzuki | 180/68.1 |
| 3,933,136 A * | 1/1976 | Burst | 123/41.58 |
| 3,978,938 A * | 9/1976 | Joscher et al. | 180/68.4 |
| 4,065,170 A * | 12/1977 | Fabian et al. | 296/37.1 |
| 4,114,714 A * | 9/1978 | Fachbach et al. | 180/68.1 |
| 4,116,269 A * | 9/1978 | Ikeda | 165/126 |
| 4,128,363 A * | 12/1978 | Fujikake et al. | 416/236 A |
| 4,445,584 A * | 5/1984 | Kimura et al. | 180/69.22 |
| 4,476,820 A * | 10/1984 | Nixon | 123/41.05 |
| 4,494,384 A * | 1/1985 | Lott | 62/279 |
| 4,510,991 A * | 4/1985 | Kawahira | 165/41 |
| 4,590,889 A * | 5/1986 | Hiereth | 123/41.05 |
| 4,619,073 A * | 10/1986 | Janthur et al. | 49/74.1 |
| 4,706,615 A * | 11/1987 | Scadding | 123/41.01 |
| 4,748,943 A * | 6/1988 | Mayer | 123/41.15 |
| 4,756,279 A * | 7/1988 | Temmesfeld | 123/41.04 |
| 4,779,577 A * | 10/1988 | Ritter et al. | 123/41.05 |
| 4,938,303 A * | 7/1990 | Schaal et al. | 180/68.1 |
| 5,046,550 A * | 9/1991 | Boll et al. | 165/41 |
| 5,205,484 A * | 4/1993 | Susa et al. | 236/35.3 |
| 5,209,285 A * | 5/1993 | Joshi | 165/41 |
| 5,476,138 A * | 12/1995 | Iwasaki et al. | 165/41 |
| 5,490,572 A * | 2/1996 | Tajiri et al. | 180/65.1 |
| 5,526,872 A * | 6/1996 | Gielda et al. | 165/41 |
| 5,901,786 A * | 5/1999 | Patel et al. | 165/283 |
| 6,023,938 A * | 2/2000 | Taras et al. | 62/296 |
| 6,237,676 B1 * | 5/2001 | Hasegawa et al. | 165/67 |
| 6,298,906 B1 * | 10/2001 | Vize | 165/41 |
| 6,318,450 B1 * | 11/2001 | Acre | 165/67 |
| 6,390,217 B1 * | 5/2002 | O'Brien et al. | 180/68.6 |
| 6,450,275 B1 * | 9/2002 | Gabriel et al. | 180/65.23 |
| 6,467,538 B1 * | 10/2002 | Acre et al. | 165/266 |
| 6,748,757 B2 * | 6/2004 | Matsuo et al. | 62/244 |
| 7,114,587 B2 * | 10/2006 | Mori et al. | 180/68.3 |
| 7,284,594 B2 * | 10/2007 | Sanada et al. | 165/41 |
| 7,410,018 B2 * | 8/2008 | Satou | 180/68.4 |
| 7,451,844 B2 * | 11/2008 | Kunikata | 180/68.1 |
| 7,497,287 B2 * | 3/2009 | Kunikata et al. | 180/68.1 |
| 7,523,798 B2 * | 4/2009 | Muramatsu et al. | 180/68.1 |
| 7,603,968 B2 * | 10/2009 | Pantow | 123/41.04 |
| 7,644,793 B2 * | 1/2010 | Iwasaki et al. | 180/68.2 |
| 7,717,208 B2 * | 5/2010 | Knauer | 180/68.6 |
| 7,823,671 B2 * | 11/2010 | Inoue et al. | 180/68.4 |
| 8,091,516 B2 * | 1/2012 | Preiss | 123/41.05 |
| 8,091,668 B2 * | 1/2012 | Amano et al. | 180/68.1 |
| 8,181,727 B2 * | 5/2012 | Ritz et al. | 180/68.1 |
| 8,281,754 B2 * | 10/2012 | Saida et al. | 123/41.04 |
| 8,292,014 B2 * | 10/2012 | Sugiyama | 180/68.1 |
| 8,312,949 B2 * | 11/2012 | Hirukawa et al. | 180/68.1 |
| 8,347,830 B2 * | 1/2013 | Tregnago et al. | 123/41.05 |
| 8,348,312 B2 * | 1/2013 | Bailey | 293/115 |
| 8,463,493 B2 * | 6/2013 | Lockwood et al. | 701/36 |
| 8,479,855 B2 * | 7/2013 | Kim et al. | 180/68.3 |
| 8,491,038 B2 * | 7/2013 | Challal et al. | 296/187.09 |
| 8,517,130 B2 * | 8/2013 | Sakai | 180/68.1 |
| 2001/0045310 A1 * | 11/2001 | Ozawa et al. | 180/68.1 |
| 2002/0162695 A1 * | 11/2002 | Ozawa et al. | 180/68.2 |
| 2004/0104007 A1 * | 6/2004 | Kolb | 165/41 |
| 2004/0226764 A1 * | 11/2004 | Iwasaki et al. | 180/68.1 |
| 2005/0029027 A1 * | 2/2005 | Kunikata et al. | 180/68.1 |
| 2006/0102109 A1 * | 5/2006 | Becker et al. | 123/41.48 |
| 2006/0211364 A1 * | 9/2006 | Brotz et al. | 454/261 |
| 2006/0237175 A1 * | 10/2006 | Hara | 165/140 |
| 2007/0062671 A1 * | 3/2007 | Sugimoto et al. | 165/67 |
| 2007/0068716 A1 * | 3/2007 | Kunikata | 180/68.4 |
| 2007/0144713 A1 * | 6/2007 | Sugimoto et al. | 165/140 |
| 2007/0199319 A1 * | 8/2007 | Bender | 60/599 |
| 2008/0017138 A1 * | 1/2008 | Rogg | 123/41.05 |
| 2009/0025661 A1 * | 1/2009 | Itoga et al. | 123/41.12 |
| 2010/0071977 A1 * | 3/2010 | Ritz et al. | 180/68.1 |
| 2010/0083917 A1 * | 4/2010 | Saida et al. | 123/41.04 |
| 2010/0116229 A1 * | 5/2010 | Kojima | 123/41.49 |
| 2010/0147611 A1 * | 6/2010 | Amano et al. | 180/68.1 |
| 2010/0243351 A1 * | 9/2010 | Sakai | 180/68.1 |
| 2010/0282533 A1 * | 11/2010 | Sugiyama | 180/68.1 |
| 2011/0083920 A1 * | 4/2011 | Mori et al. | 180/68.4 |
| 2011/0097984 A1 * | 4/2011 | Hasegawa et al. | 454/152 |
| 2011/0226542 A1 * | 9/2011 | Steller | 180/68.4 |
| 2011/0241378 A1 * | 10/2011 | Steller | 296/187.09 |
| 2012/0022742 A1 * | 1/2012 | Nemoto | 701/36 |
| 2012/0090906 A1 * | 4/2012 | Charnesky et al. | 180/68.1 |
| 2012/0111652 A1 * | 5/2012 | Charnesky et al. | 180/68.1 |
| 2012/0132474 A1 * | 5/2012 | Charnesky et al. | 180/68.1 |
| 2012/0182138 A1 * | 7/2012 | Nakayama et al. | 340/425.5 |
| 2012/0194328 A1 * | 8/2012 | Nakayama et al. | 340/425.5 |
| 2012/0285757 A1 * | 11/2012 | Atarashi et al. | 180/68.1 |
| 2012/0312611 A1 * | 12/2012 | Van Buren et al. | 180/68.1 |
| 2012/0323448 A1 * | 12/2012 | Charnesky et al. | 701/49 |
| 2013/0092462 A1 * | 4/2013 | Chinta | 180/68.1 |
| 2013/0126253 A1 * | 5/2013 | Saito et al. | 180/68.1 |
| 2013/0180789 A1 * | 7/2013 | Maurer et al. | 180/68.1 |

FOREIGN PATENT DOCUMENTS

| | | |
|---|---|---|
| EP | 1216872 A1 | 6/2002 |
| GB | 2131150 A | 6/1984 |
| JP | 2007-001503 A | 1/2007 |

OTHER PUBLICATIONS

English language abstract and translation for DE 4123271 extracted from the espacenet.com database on May 21, 2012, 8 pages.

English language abstract and translation for JP 2007-001503 extracted from the PAJ database on May 21, 2012, 34 pages.

International Search Report for Application No. PCT/EP2010/064341 dated Feb. 17, 2011, 4 pages.

* cited by examiner

HEAT EXCHANGE BLOCK FOR A MOTOR VEHICLE

RELATED APPLICATIONS

This application claims priority to and all the advantages of International Patent Application No. PCT/EP2010/064341, filed Sep. 28, 2010, which claims priority to French Patent Application No. FR 09/04647, filed on Sep. 29, 2009.

The invention relates to a thermal exchange block for a motor vehicle, the block being intended to be mounted behind the front surface of the said vehicle in such a way as to be traversed by air originating from a corresponding opening provided at the level of the front grille panel.

BACKGROUND TO THE INVENTION

The exchanger that is mounted on the front surface of a motor vehicle generally constitutes part of a thermal block utilized to cool the power train components of the vehicle. The said thermal block consists of a thermal exchanger or a heat exchanger supported on a frame and louvers capable of moving between an open position and a closed position.

The said thermal block may also include another thermal exchanger, being part of an air conditioning circuit for cooling the air inside the passenger compartment.

The louvers with which the exchanger ensuring the cooling of the power train components is equipped permit the adjustment of the flow of air passing through the exchanger (in this case a radiator) and originating from the opening in the grille panel, depending on the operating conditions.

When the engine is cold, the louvers are closed in such a way as to obtain zero cooling in order for the rise in temperature of the power train to be as rapid as possible. On the other hand, when the hot power train is under heavy load, the louvers are opened in such a way as to maximize the flow of air and thus to increase the efficiency of the cooling.

It has generally been established that, when the louvers are in their closed position, the heat-transfer liquid circulating inside the heat exchanger is cooled nevertheless, the effect being to slow down the time taken by the power train components to increase in temperature.

OBJECT OF THE INVENTION

The aim of the invention is to propose a solution to reduce as far as possible the cooling sustained by the heat-transfer liquid circulating inside the thermal exchanger when the louvers are closed.

SUMMARY OF THE INVENTION

To this end, the invention has as its object a thermal exchange block for a motor vehicle including at least one thermal exchanger, the said block being intended to be disposed behind a front grille panel of a vehicle and intended to be traversed by air originating from an opening in the said grille panel, the said block comprising a group of louvers that can move between an open position and a closed position in order to modulate the flow of air passing through the one or more thermal exchangers and a channel that can be disposed between the opening in the grille panel and the thermal exchange block.

With this solution, when the louvers are closed, the air originating from the opening in the grille panel is not able to flow around the one or more thermal exchangers in order to cause perturbations behind and around the one or more exchangers producing undesired cooling of the heat-transfer liquid circulating inside the exchanger.

The invention also relates to a thermal exchange block as defined above, in which the channel can be disposed between the opening in the grille panel and the one or more thermal exchangers.

The invention also relates to a thermal exchange block as defined above, in which the exchanger is surrounded by a common supporting frame constituting an extension of the channel.

The invention also relates to a thermal exchange block as defined above, comprising a plurality of thermal exchangers arranged one behind the other in order to be traversed successively by the air originating from the opening in the grille panel.

The invention also relates to a thermal exchange block as defined above, in which the channel is provided with airtight fastening means for fastening it to the grille panel in order to ensure that, with the louvers in their closed position, the flow of air passing through the opening and the one or more thermal exchangers is essentially zero.

The invention also relates to a thermal exchange block as defined above, additionally comprising a fan for increasing the flow of air passing through the one or more exchangers when the speed of the vehicle is insufficient.

The invention also relates to a thermal exchange block comprising a plurality of thermal exchangers intended to be disposed behind a front grille panel of a vehicle and intended to be traversed by air originating from an opening in the said grille panel, the said thermal exchangers being arranged one behind the other in order to be traversed successively by the air originating from the opening in the grille panel. In this embodiment, the said block additionally comprises a group of louvers that can move between an open position and a closed position in order to modulate the flow of air passing through the thermal exchanger and a channel that can be disposed between the opening in the grille panel and the said thermal exchange block, the said block also comprising a fan for increasing the flow of air passing through the exchangers when the speed of the vehicle is insufficient.

The invention also relates to a thermal exchange block as defined above, in which the said fan is arranged between the said group of moving louvers and the said thermal exchangers.

The invention also relates to a thermal exchange block as defined above, in which the channel is dimensioned so as to constitute a pedestrian impact shock absorber.

The invention also relates to a thermal exchange block as defined above, additionally consisting of at least one aerodynamic conveyor arranged between the group of movable louvers and a thermal exchanger.

DETAILED DESCRIPTION OF THE INVENTION

The invention is based on the observation that, in known systems, when the louvers of an exchanger situated on the front surface are closed, the cooling air that enters via the opening in the grille panel flows around the exchanger and generates turbulences behind it which bring about undesired cooling of the heat-transfer liquid passing through or circulating inside the said exchanger.

Proposed in the invention is a channel disposed between the thermal block (and in one particular example of the exchanger) and the opening of the grille panel, in such a way that, when the louvers are closed, the air that is capable of entering via the opening is blocked and is not able to flow around the exchanger.

Figure 1:
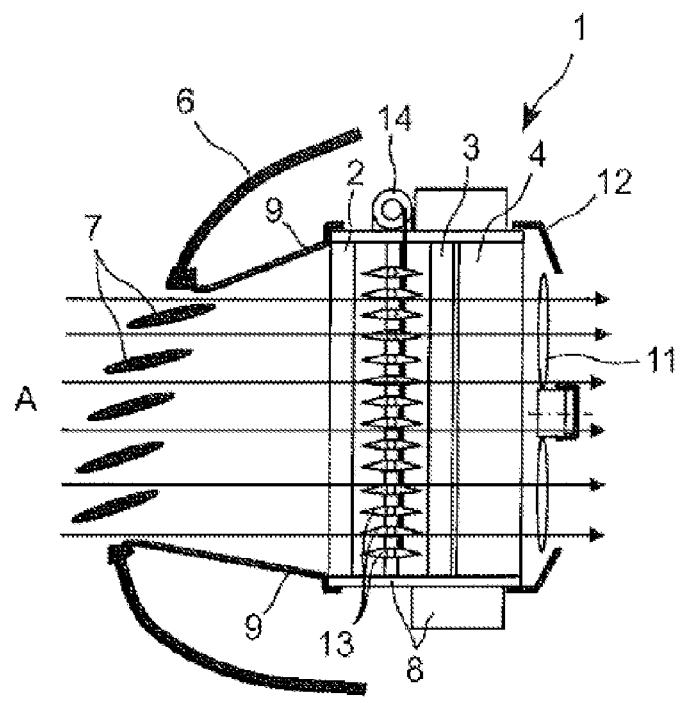
FIG. 1 is a schematic representation as a side view of a first embodiment of the invention, of which the louvers are shown open.
Figure 2:
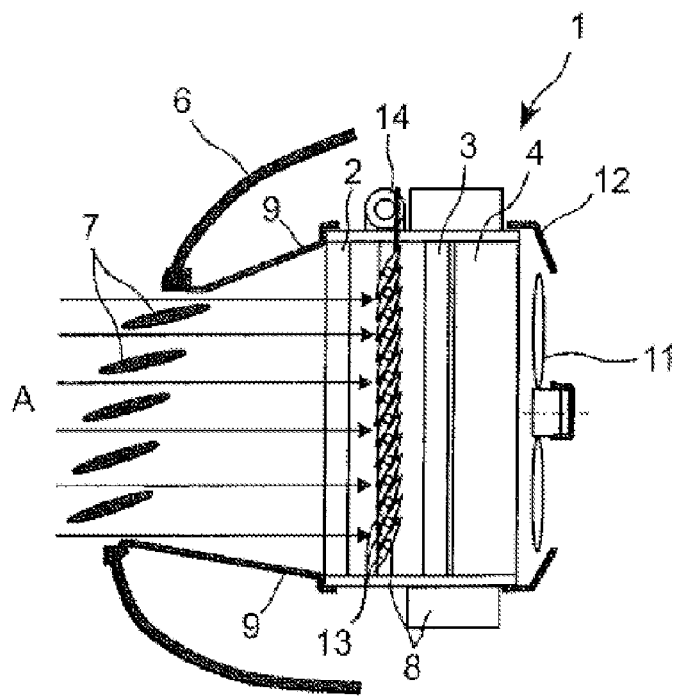
FIG. 2 is a schematic representation as a side view of the first embodiment of the invention, of which the louvers are shown closed.

In a first embodiment of the invention, which is depicted in FIGS. 1 and 2, the thermal exchange block 1 comprises three thermal exchangers designated as 2, 3 and 4, which are arranged one after the other according to the direction of travel of the vehicle.

The said thermal exchange block 1 is intended to be mounted behind a front grille panel of a motor vehicle, which is represented in the figure, where it is designated as 6, being situated opposite an opening in the said grille panel, the said opening being equipped with a grille 7.

In operation, for example when the vehicle is moving forwards, air A passes through the grille 7 before arriving at the various exchangers 2, 3 and 4 in order to pass through them successively as a consequence of their being positioned one after the other.

In the arrangement depicted in FIGS. 1 and 2 and in this embodiment, starting from the grille 7 and following the direction of travel of the vehicle, the flow of air A first passes through the exchanger 2, being a condenser, and it then passes through the exchanger 3, being a charge air cooler, before passing through the exchanger 4, being a radiator for cooling the means of propulsion of the vehicle.

In practice, the condenser 2 is part of an air conditioning circuit utilized to air condition the passenger compartment by cooling it, depending on the circumstances.

The said three exchangers 2, 3 and 4, which are mounted one behind the other in the direction of travel of the vehicle, are supported on the same common frame or support, designated as 8, which surrounds or encloses the said three exchangers jointly. The said surrounding frame 8 in this case constitutes an airtight envelope which channels the air in order to ensure that the totality of the flow of air passing through the first exchanger 2 also necessarily passes through the other exchangers 2, 3.

In order to regulate the flow of air A, the thermal exchange block is equipped with a group of louvers 13 that can move between an open state corresponding to that illustrated in FIG. 1, in which they permit the totality of the flow of air A to pass through the various exchangers, and a closed state corresponding to FIG. 2, and in which they prevent the passage of air through the various exchangers 2, 3, 4 of the block 1.

The said louvers 13 are mounted, for example, in the frame 8 or at the level of the latter, between the first and the second exchanger 2 and 3, and they extend here for the totality of the internal cross section of the said frame in such a way that they can completely obstruct the internal passage defined by the frame 8 when the said louvers 13 are closed. They are displaced between their open position and their closed position by a motorized device 14, the said motorized device 14 itself being operated by a control unit that is not illustrated here.

The thermal exchange block 1 is additionally equipped with a conduit 9 disposed between the opening in the grille panel and, in this example, its air inlet grille 7 and the frame 8 surrounding the thermal exchangers of which it is an extension. The said conduit 9 extends in the general direction of travel of the vehicle and presents a closed contour when it is viewed in section in a plane perpendicular to the said direction of travel.

Thanks to this channel 9, when the louvers are closed, the air is not able to flow around the exchangers, so that closing of the louvers is sufficient more or less completely to arrest the cooling of the heat-transfer liquid circulating inside the exchangers.

In order to ensure that the flow of air passing through the opening in the grille panel is essentially zero when the louvers are closed, the front extremity of the channel is advantageously provided with means permitting it to be secured in an airtight manner to the grille panel around the opening.

In order to create a sufficient flow of air A when the speed of the vehicle is too low, the thermal exchange block 1 in FIGS. 1 and 2 is equipped on its rear surface with a fan 11 and a shroud 12. The said fan is thus situated opposite the third heat exchanger 4, and it is surrounded by the shroud 12, which extends the enveloping frame 8, and thanks to which almost all the air displaced by the fan is air that has effectively passed through the exchangers 2, 3, 4.

In general, the invention is applicable to different architectures of thermal blocks: in the case of FIGS. 1 and 2, the thermal block consists of three exchangers 2, 3 and 4, although it may equally well consist of only the exchanger 3 and/or the exchanger 4.

Figure 3:
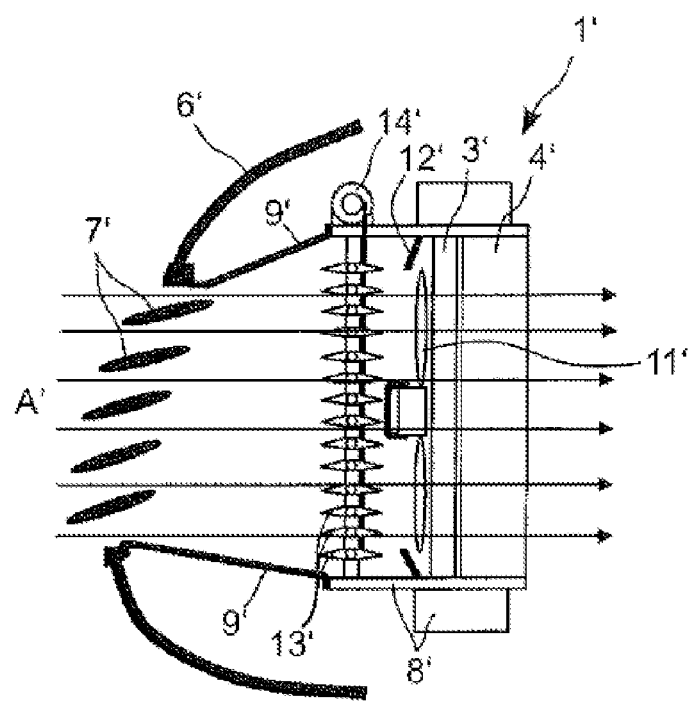
FIG. 3 is a schematic representation as a side view of a second embodiment of the invention, of which the louvers are shown open.
Figure 4:
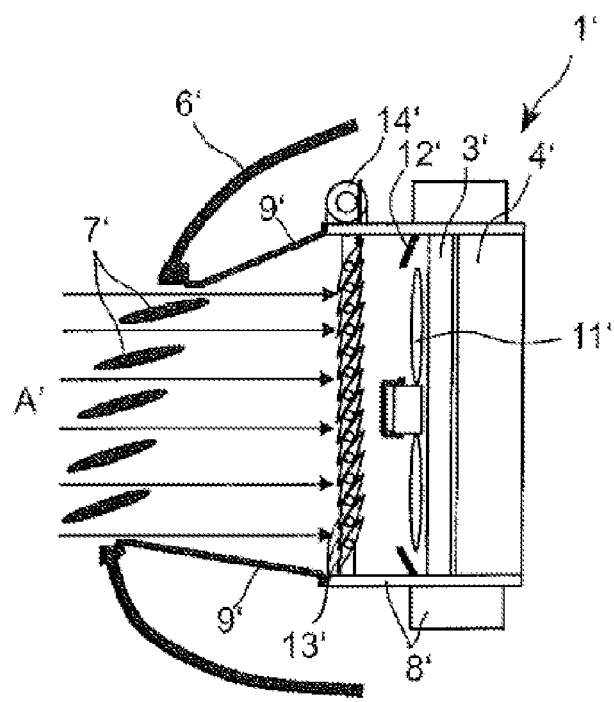
FIG. 4 is a schematic representation as a side view of the second embodiment of the invention, of which the louvers are shown closed.

In another embodiment, which is depicted in FIGS. 3 and 4, the thermal exchange block, which is designated as 1', consists of the same component parts as the thermal block 1 in FIGS. 1 and 2, the difference being that it consists of two exchangers instead of three, and that the arrangement of the elements supported by its frame is different.

Thus, in general terms, in this second embodiment, the thermal exchange block 1' is mounted behind a front grille panel 6' and opposite a grille 7' in the said grille panel, it comprises a frame 8' supporting and surrounding a plurality of elements, together with a channel or conduit 9' situated between the grille panel and the frame 8' of which it is an extension.

In this other embodiment, the frame 8' supports an exchanger 3', in this case being an evaporator-condenser, and an exchanger 4', being a radiator for cooling the power train components of the vehicle. The exchangers 3' and 4' in this case are also situated one behind the other in the direction of travel of the vehicle, so that the air admitted into the conduit 9' passes successively through the exchangers 3' and 4'.

The thermal block 1' is also equipped with louvers 13' operated by an actuator 14', the said louvers 13' being mounted in the internal section of the frame 8', although being situated in front of the fan 11', that is to say between the said fan 11' and the channel 9'.

As can be appreciated from FIGS. 3 and 4, the louvers 13' in this case can also move between an open position as in FIG. 3, in order to permit all the air A' to pass through the exchangers, and a closed position as in FIG. 4, in which they prevent the air A' from passing through the exchangers.

As in the case of the first embodiment of the invention, the conduit 9' ensures that, when the louvers are closed, the air A' is not able to flow around the exchangers in order to cool the heat-transfer liquid circulating inside the latter. In other words, thanks to the presence of the channel 9', the louvers permit the air passing through the grille panel to be blocked completely.

The said thermal block 1' is also equipped with a fan 11' and with a shroud 12', which in this case are mounted on the frame 8', on the front surface of the exchanger 3', that is to say the exchanger 3' and the channel 9', instead of being mounted on the rear surface of the radiator for cooling the power train components. In other words, in this embodiment, the fan 11' is positioned between the group of movable louvers and the thermal exchangers. In other words, the fan 11' is integrated into the thermal block 1' between the group of movable louvers and the thermal exchangers.

The function of the shroud 12' in this case is also to ensure that all the air displaced by the fan passes through the exchangers in such a way as to optimize the output of the said fan.

The fan 11' and its associated shroud 12' ensure a sufficient flow of air through the exchangers 3' and 4' when the speed of the vehicle is insufficient.

Figure 5:
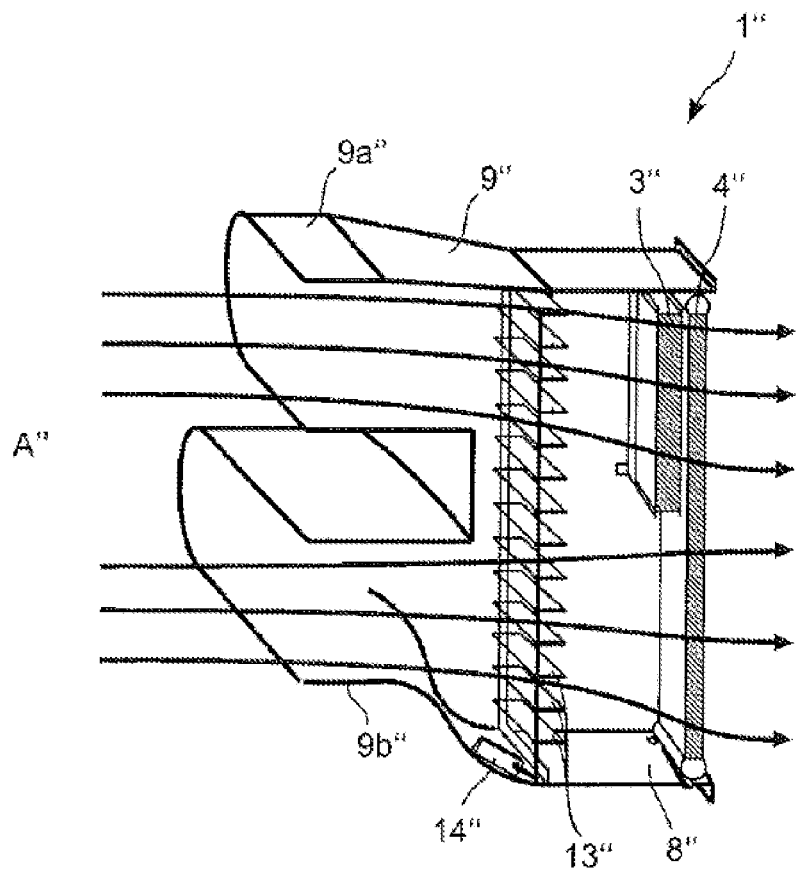
FIG. 5 is a schematic representation as a side view of a third embodiment of the invention, of which the louvers are shown closed.

In a third embodiment, which is depicted in FIG. 5, the thermal exchange block, which is designated as 1", consists of the same component parts as the thermal block 1 in FIGS. 1 and 2, the difference being that it consists of two exchangers instead of three, which in this case have different dimensions from one another, and that the channel 9" exhibits a general form which differs from those depicted in FIGS. 1 to 4.

Thus, in general terms, in this third embodiment, the thermal exchange block 1" is mounted behind a front grille panel, which is not illustrated here, and opposite a grille, which is not illustrated here, equipping the said grille panel, it comprises a frame 8" supporting and surrounding a plurality of elements, together with a channel 9" situated between the grille panel, which is not illustrated here, and the frame 8" of which it is an extension.

The frame 8" supports two exchangers 3" and 4", the exchanger 3" being significantly smaller than the exchanger 4", which exchangers in this case are also situated one behind the other in the direction of travel of the vehicle, so that the air admitted into the conduit 9" passes through them successively.

The thermal block 1" is equipped with louvers 13" operated by an actuator 14", the said louvers 13" in this case also being mounted in the internal section of the frame 8". The louvers 13" in this case can also move between an open position permit all the air A" to pass, and a closed position in order to prevent the air A" from passing through the exchangers.

The conduit 9" in this case has a progressive form comprising a rear section extending the frame 8" and extending towards the front in two distinct branches or conduits 9"a and 9"b.

The upper branch 9a" thus collects the air originating from an upper grille of the grille panel, whereas the lower branch 9b" collects the air originating from a lower grille of the said grille panel. The said channel 9" thus exhibits in its rear part a cross section forming a closed contour and in its front part a cross section delimiting two closed contours.

In addition, the block 1" may also be equipped with a fan in order to force the circulation of air when required by the circumstances, the said fan in this case being capable of being mounted as in the first embodiment or as in the second embodiment.

In general terms, it should be noted that, in the different embodiments, taking into account the position of the channel, which is situated between the grille panel of the vehicle and its exchangers, the grille panel may advantageously be dimensioned so as to constitute a pedestrian impact shock absorber. In other words, its mechanical rigidity in the longitudinal direction may be selected so as to contribute to the absorption of the shock of a pedestrian colliding with the front grille panel of the vehicle.

Figure 6:
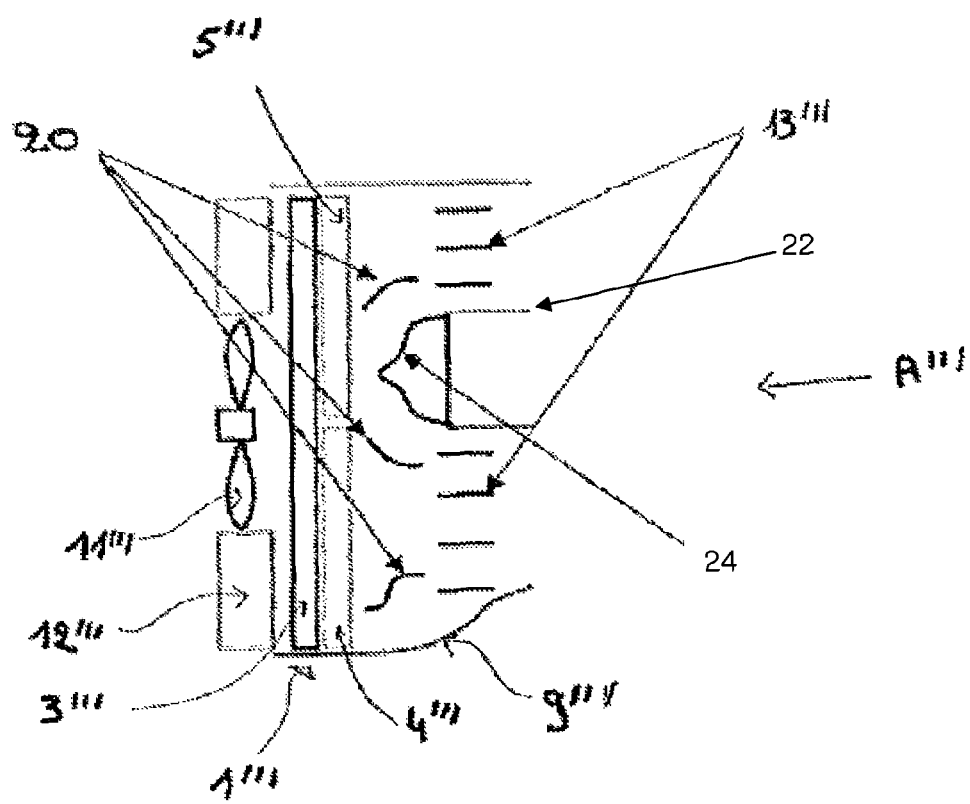
FIG. 6 is a schematic representation as a side view of the third embodiment of the invention, of which the louvers are shown open.

FIG. 6 depicts a fourth embodiment of the invention. The thermal exchange block in this case, which is designated as 1''', consists of the same component parts as the thermal block 1 in FIGS. 1 and 2, the difference being that it consists of three exchangers, two of which are positioned one on top of the other.

The thermal exchange block 1''' is mounted behind a front grille panel, not illustrated here, and opposite a grille, not illustrated here, equipping the said grille panel. The thermal block 1''' also consists of a channel 9''' situated between the grille and the frame (not illustrated) of which it is an extension. The frame supports and surrounds a plurality of elements, of which the exchangers 3''' and 4''' and 5''', the exchanger 3''' being situated behind the exchangers 4''' and 5''' in the direction of circulation of the air A'''. Here, the exchangers 4''' and 5''' are situated one on top of the other.

The thermal block 1''' additionally consists of louvers 13''' operated by an actuator, not illustrated here, the said louvers 13''' also being mounted in this case in the internal section of the frame 8'''. The louvers 13''' in this case can also move between an open position permit all the air A''' to pass, and a closed position in order to prevent the air A''' from passing through the exchangers.

In this case, the block 1''' is equipped with a fan 11''' interacting with a shroud 12''' in order to force the circulation of air when required by the circumstances, the said fan in this case being mounted ahead of the thermal block 1'''.

Deflectors or aerodynamic conveyors 20 are proposed in this embodiment. In this embodiment, the conveyors 20 are incorporated into the thermal block 1'. In the embodiment illustrated here, the thermal block 1''' consists of three aerodynamic conveyors 20.

The aerodynamic conveyors are arranged between the thermal exchangers and the movable louvers 13'''.

The purpose of the said aerodynamic conveyors 20 is to guide the flow of air as it enters towards the zones of the thermal exchangers that are masked by a fender beam 22.

In the embodiment illustrated here, the fender beam 22 of the motor vehicle is itself equipped with a deflector 24 executed here in the form of a cowl. The cowl is positioned to the rear of the beam 22 in the direction of circulation of the air A'''.

The invention claimed is

1. A thermal exchange block for a motor vehicle, including at least one thermal exchanger, wherein the block is intended to be disposed behind a front grille panel of a vehicle and is traversed by air originating from an opening in the front grille panel, the block comprising a group of louvers that can move between an open position and a closed position in order to modulate the flow of air passing through the at least one thermal exchanger, and a channel disposed between the opening in the grille panel and the thermal exchange block, wherein the channel includes an airtight fastening means configured to fasten the channel in an airtight manner to the grille panel in order to ensure that, when the louvers are in the closed position, the flow of air passing through the opening of the grille panel is not able to flow around the at least one thermal exchanger, and wherein the channel is dimensioned to constitute a pedestrian impact shock absorber having a mechanical rigidity in a longitudinal direction that is selected so as to contribute to an absorption of a shock associated with a pedestrian colliding with the front grille panel.

2. The thermal exchange block as claimed in claim 1, in which the thermal exchanger is surrounded by a supporting frame constituting an extension of the channel.

3. The thermal exchange block as claimed in claim 1, wherein the at least one thermal exchanger is a plurality of thermal exchangers arranged one behind the other in order to be traversed successively by the air originating from the opening in the grille panel.

4. The thermal exchange block as claimed in claim 1, additionally comprising a fan for increasing the flow of air passing through the at least one thermal exchanger when the speed of the vehicle is insufficient.

5. The thermal exchange block as claimed in claim 1, additionally comprising at least one aerodynamic conveyor arranged between the group of louvers and a thermal exchanger.

* * * * *